(12) United States Patent
Hsu et al.

(10) Patent No.: US 7,661,176 B2
(45) Date of Patent: Feb. 16, 2010

(54) HINGE ASSEMBLY

(75) Inventors: Jia-Hao Hsu, Shulin (TW); Ting-Hsien Wang, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 189 days.

(21) Appl. No.: 11/878,321

(22) Filed: Jul. 24, 2007

(65) Prior Publication Data

US 2009/0025180 A1    Jan. 29, 2009

(51) Int. Cl.
*E05D 17/64* (2006.01)
(52) U.S. Cl. .............................. 16/342; 16/374; 16/387
(58) Field of Classification Search .................. 16/342, 16/374, 387
See application file for complete search history.

(56) References Cited

U.S. PATENT DOCUMENTS

| | | | |
|---|---|---|---|
| 5,896,622 A * | 4/1999 | Lu | 16/342 |
| 6,170,120 B1 * | 1/2001 | Lu | 16/342 |
| 6,230,365 B1 * | 5/2001 | Lu | 16/342 |
| 6,321,416 B1 * | 11/2001 | Lu | 16/374 |
| RE37,712 E * | 5/2002 | Gannon | 16/342 |
| 6,928,700 B2 * | 8/2005 | Huong | 16/342 |
| 7,451,522 B2 * | 11/2008 | Lu et al. | 16/342 |
| 7,458,549 B2 * | 12/2008 | Oddsen, Jr. | 248/280.11 |
| 2004/0083577 A1 * | 5/2004 | Lu et al. | 16/367 |
| 2006/0117530 A1 * | 6/2006 | Lu et al. | 16/342 |
| 2007/0094845 A1 * | 5/2007 | Chang et al. | 16/342 |
| 2007/0101543 A1 * | 5/2007 | Lu et al. | 16/342 |
| 2007/0234519 A1 * | 10/2007 | Chen | 16/342 |

* cited by examiner

*Primary Examiner*—Victor Batson
*Assistant Examiner*—Michael Lee
(74) *Attorney, Agent, or Firm*—Posz Law Group, PLC

(57) ABSTRACT

A hinge assembly attaches a cover pivotally to a base of an electronic device and has a stationary leaf, a bushing and a pivoting leaf The stationary leaf is attached to the base and has a barrel and two slots. Each slot is formed in the barrel. The bushing is mounted in the barrel and has two end edges and two securing members. Each securing member is formed from the bushing and is mounted in the corresponding slot. The pivoting leaf is mounted rotatably in the bushing and attaches to the cover. Consequently, the hinge has a small bushing and uses less material reducing the size and weight of the hinge assembly, and the same of the electronic device.

7 Claims, 6 Drawing Sheets

HINGE ASSEMBLY

BACKGROUND OF THE INVENTION

1. Field of the Invention

The present invention relates to a hinge assembly, and more particularly to a hinge assembly to attach a cover pivotally to a base of an electronic device.

2. Description of the Prior Arts

With reference to FIGS. 6 and 7, electronic devices such as notebook computers (60) have a cover (62), a base (61) and a conventional hinge (50). The conventional hinge (50) connects the cover (62) pivotally to the base (61) and provides friction to hold the cover in a variety of positions relative to the base.

The conventional hinge comprises a stationary leaf (51), a bushing (52) and a pivoting leaf (53).

The stationary leaf (51) is attached securely to the base (61) and has a distal end, a barrel housing (512) and a slot (513). The barrel housing (512) is formed in the distal end of the stationary leaf (51) and has an inside surface. The slot (513) is formed longitudinally on the inside surface of the barrel housing (512).

The bushing (52) is mounted securely in the barrel housing (512) and has a gudgeon, a channel (521) and a neck (522). The gudgeon is formed coaxially through the bushing (52). The channel (521) is formed longitudinally through the bushing (52) and communicates with the gudgeon and allows the bushing (52) to expand and fit tightly in the barrel housing. The neck (522) is formed longitudinally on the bushing and engages the slot (513) to securely mount the bushing (52) inside the barrel housing (512) of the stationary leaf (51).

The pivoting leaf (53) is securely mounted rotatably through the gudgeon of the bushing (52), is mounted securely on the cover (62) to allow the cover (62) to pivot relative to the base (61) and has a proximal end, a distal end, a mounting leaf (531) and a pintle (532). The mounting leaf (531) is formed on the distal end and attaches securely to the cover (61). The pintle is formed on the proximal end of the pivoting leaf (53) and is mounted rotatably through the gudgeon of the bushing (52), causing the bushing to expand and hold the hinge assembly securely together.

However, electronic devices are designed thinner and lighter for convenience and the neck of the conventional hinge prevents further downscaling and weight reduction. That limits how thin the electronic device may be. To overcome the shortcomings, the present invention provides a hinge assembly to mitigate or obviate the aforementioned problems.

SUMMARY OF THE INVENTION

The primary objective of the present invention is to provide a hinge assembly that uses less material so is small and light.

A hinge assembly attaches a cover pivotally to a base of an electronic device and has a stationary leaf, a bushing and a pivoting leaf The stationary leaf is attached to the base and has a barrel and two slots. Each slot is formed in the barrel. The bushing is mounted in the barrel and has two end edges and two securing members. Each securing member is formed from the bushing and is mounted in the corresponding slot. The pivoting leaf is mounted rotatably in the bushing and attaches to the cover. Consequently, the hinge has a small bushing and uses less material thereby reducing the size and weight of the hinge assembly, and the same of the electronic device.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
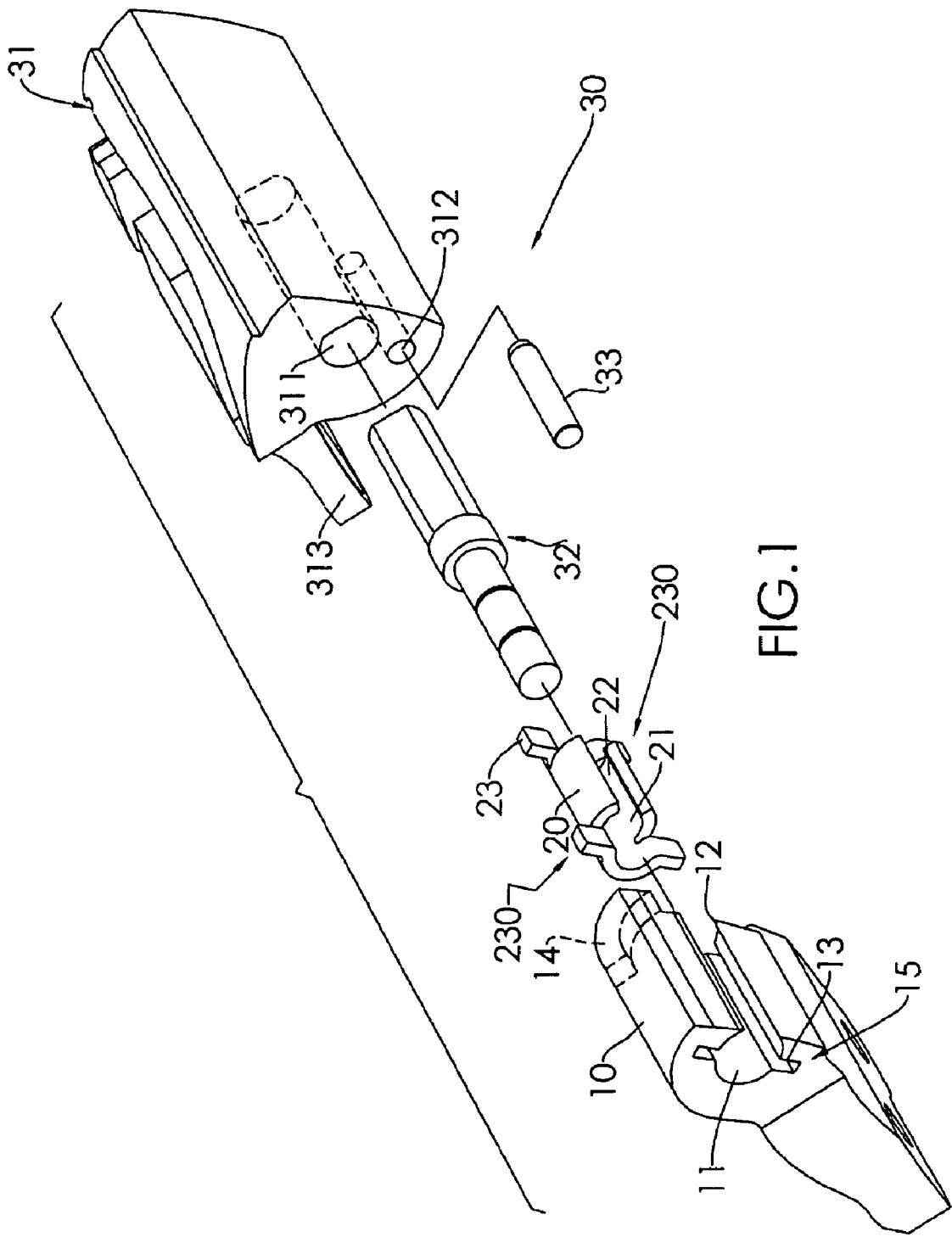
FIG. 1 is an exploded perspective view of a hinge assembly in accordance with the present invention.
Figure 2:
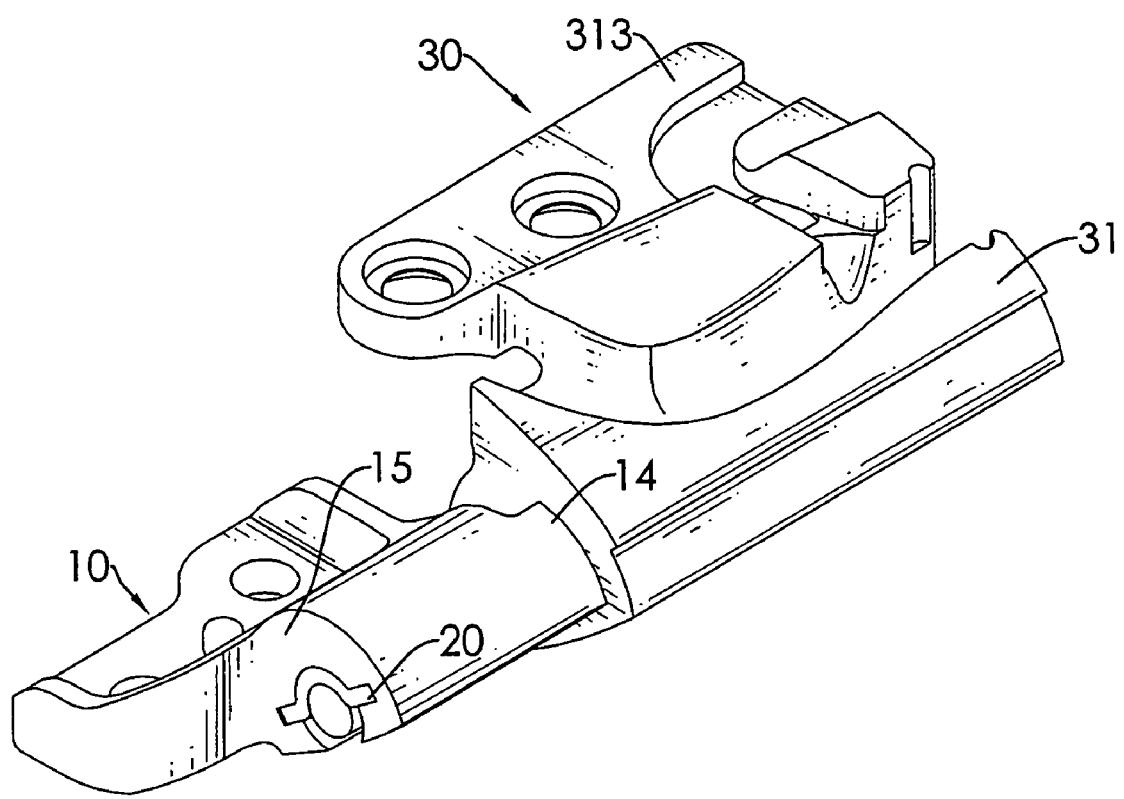
FIG. 2 is a perspective view of the hinge assembly in FIG. 1.
Figure 3:
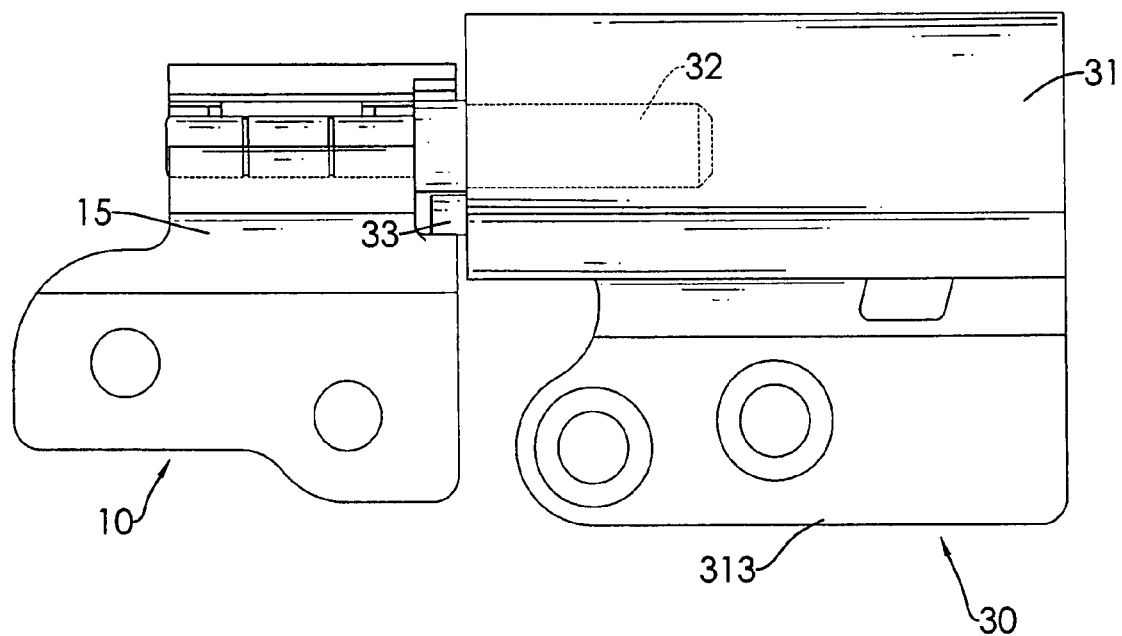
FIG. 3 is a bottom view of the hinge assembly in FIG. 1, with internal segments of a pintle shown in broken lines.
Figure 4:
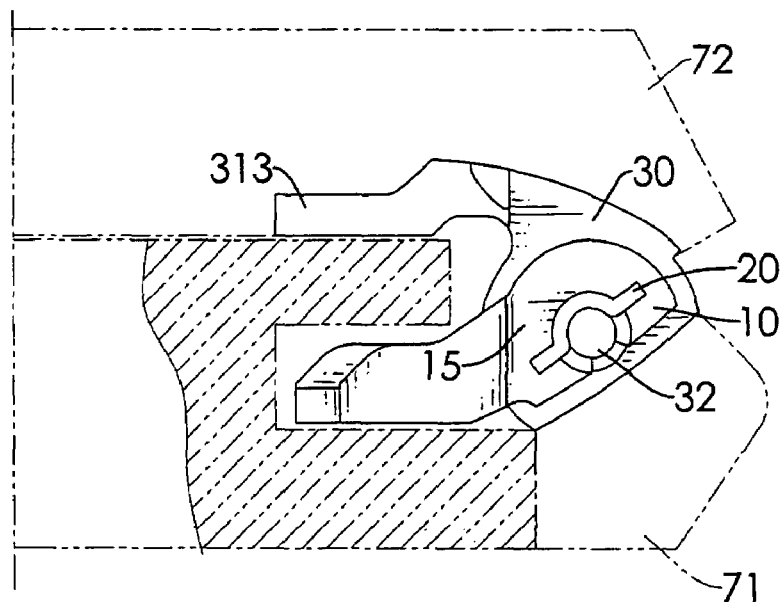
FIG. 4 is a side view in partial section of the hinge assembly in FIG. 1 mounted in a notebook computer shown closed.
Figure 5:
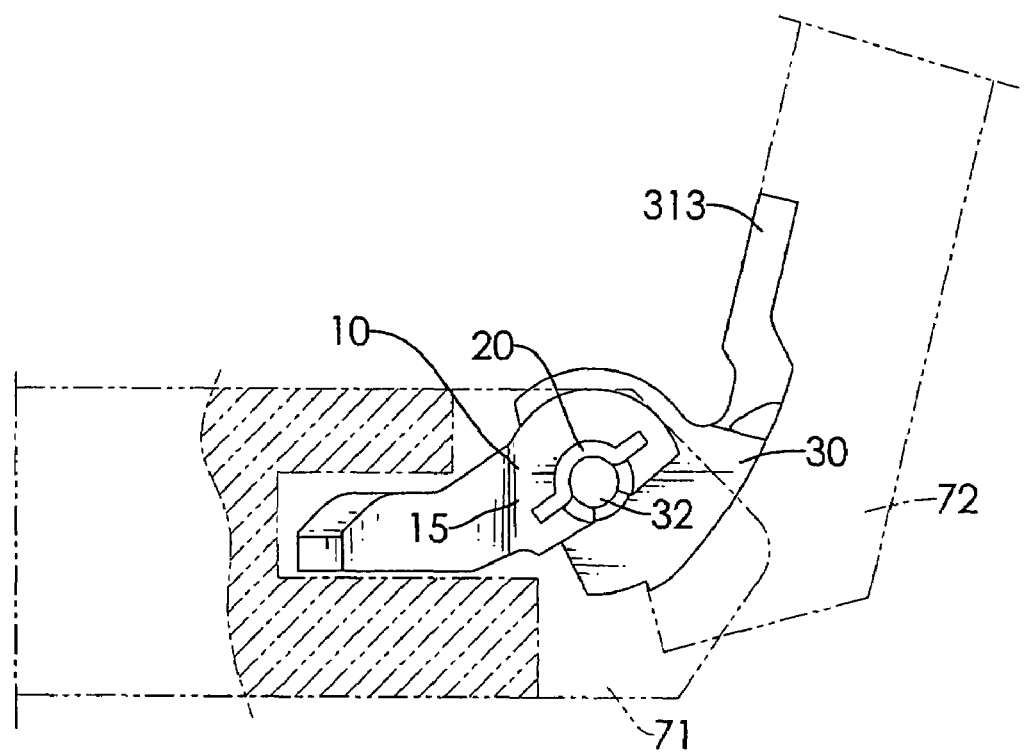
FIG. 5 is an operational side view in partial section of the hinge assembly in FIG. 4, shown open.
Figure 6:
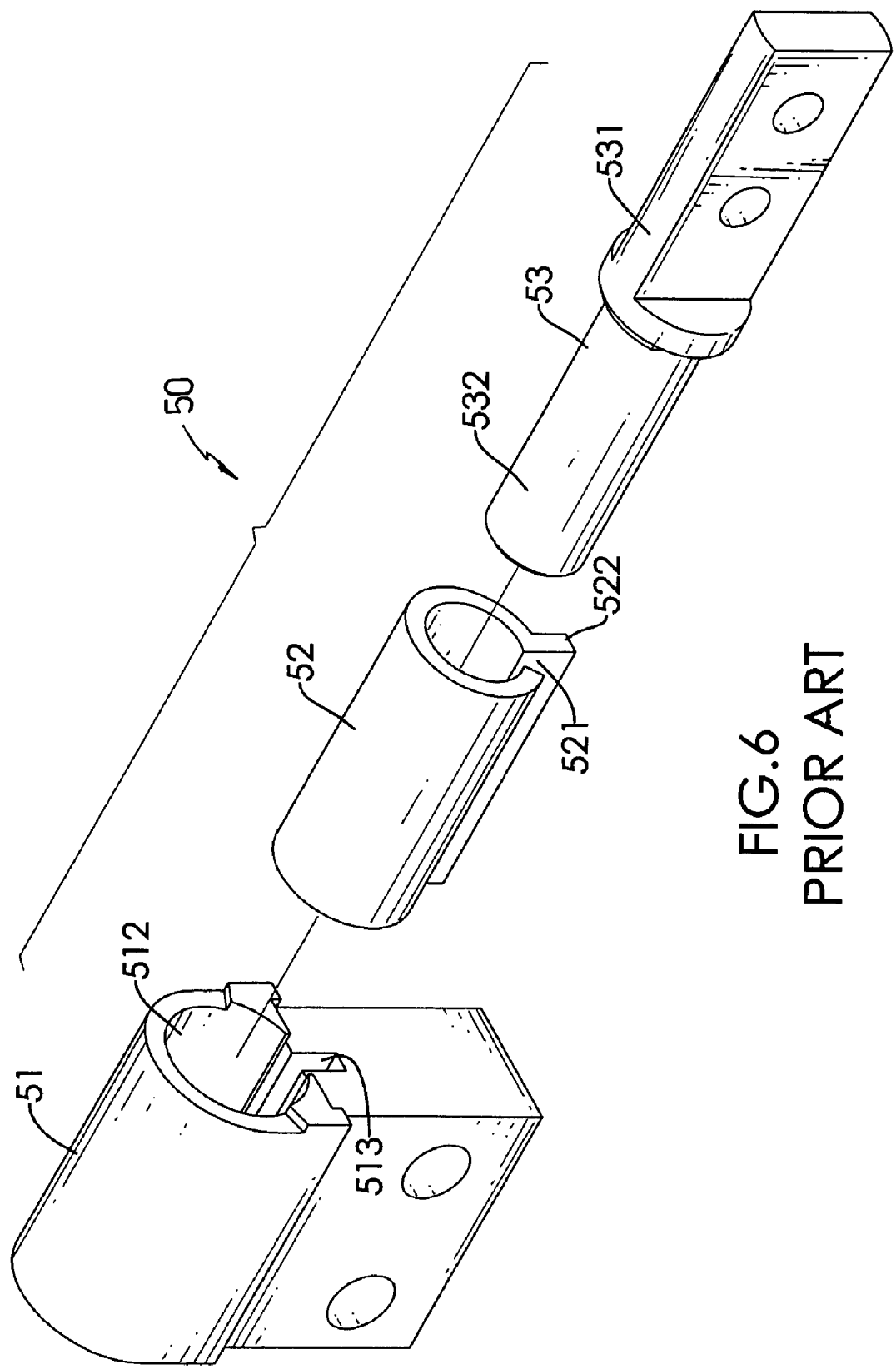
FIG. 6 is an exploded perspective view of a conventional hinge in accordance with the prior art.
Figure 7:
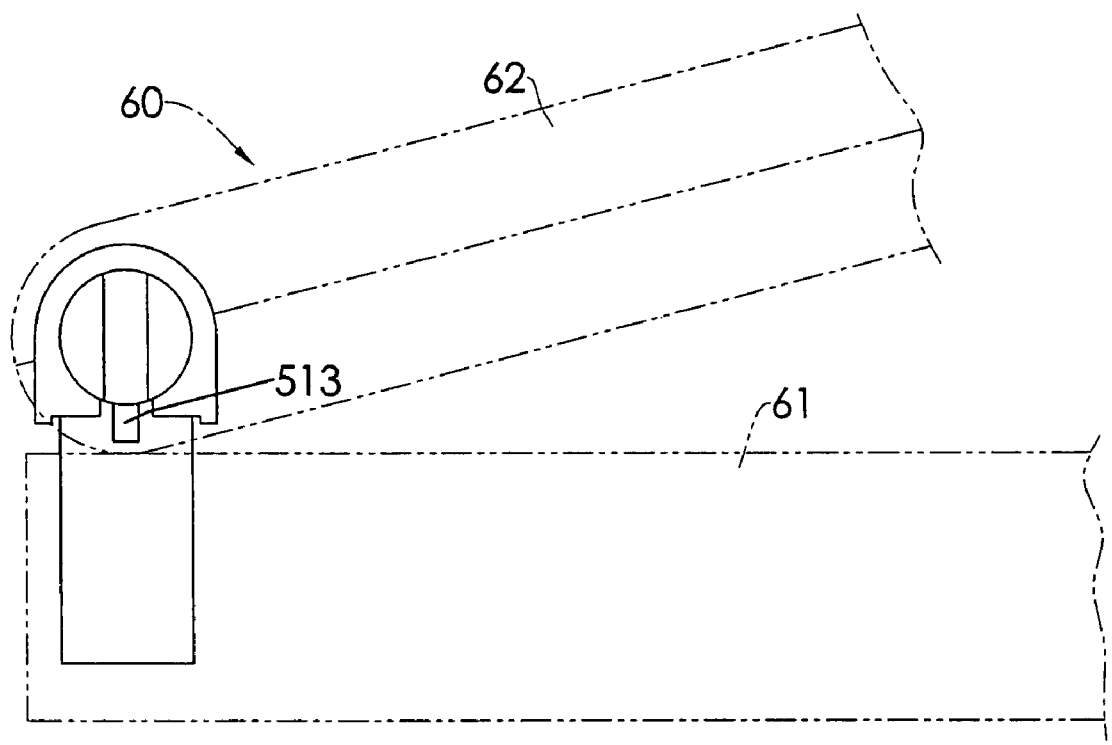
FIG. 7 is a side view of the conventional hinge in FIG. 6 mounted in a notebook computer.

With reference to FIGS. 1, 2 and 4, a hinge assembly in accordance with the present invention attaches a cover (72) pivotally to a base (71) of an electronic device such as a notebook computer and comprises a stationary leaf (10), a bushing (20) and a pivoting leaf (30).

The stationary leaf (10) is attached securely to the base (71) of the electronic device and has a distal end, a barrel (15), an optional channel (12), two slots (13) and an optional limiting protrusion (14).

The barrel (15) has a mounting hole (Il), and inner surface and two end edges. The mounting hole (11) is formed coaxially through the barrel (15).

The channel (12) is formed longitudinally through the inner surfers and the end edges of the barrel and communicates with the mounting hole (11).

The slots (13) are opposite to each other and formed longitudinally in the inside surface and through the end edges of the barrel (15) and communicate with the mounting hole (11).

The limiting protrusion (14) is formed on the corresponding end edge of the barrel (15).

The bushing (20) is mounted securely in the mounting hole (11) and has two end edges, a gudgeon (21), a slit (22) and two securing members (230).

The gudgeon (21) is formed coaxially through the bushing (20).

The slit (22) is formed longitudinally through the bushing (20) to allow the bushing (20) to be expanded to fit tightly in the barrel (15) and may correspond to and align with the channel (12).

The securing members (230) are formed symmetrically on the bushing (20) by cutting and bending, protrude toward opposite directions and respectively engage the slots (13) of the stationary leaf (10) to hold the bushing (20) securely. In a preferred embodiment, each securing member (230) may have a tab (23). The two tabs (23) of the securing members (230) are formed respectively on the end edges of the bushing (20). In another preferred embodiment, each securing member (230) may have two tabs (23). The tabs (23) protrude transversely from the bushing (20) and may be formed respectively on the end edges of the bushing (20).

Preferably, the slots (13) are formed in a predetermined portion of the stationary leaf (10) in a way, as shown clearly in FIGS. 1, 2, 4 or 5, that the two slots (13) are diametrically opposite to each other so that the bushing (20) is adapted to be fitted into the mounting hole(11) when the slit (22) of the bushing (20) faces either the channel (12) or the inner surface of barrel (15) of the stationary leaf (10) in order to accelerate the assembling process between the stationary leaf (10) and the bushing (20).

The pivoting leaf (30) is mounted rotatably and tightly in the gudgeon (21) of the bushing (20), abuts the corresponding end edge of the barrel (15), is attached securely to the cover (72) to allow the cover (72) to pivot relative to the base (71) and has a proximal end, a body (31), a pintle (32) and an optional positive stop (33).

The body (31) has a proximal end, an outside wall, an optional keyed hole (311), an optional stop hole (312) and a mounting leaf (313). The keyed hole (311) is formed longitudinally in the proximal end of the body (31) and is non-circular in cross-section. The stop hole (312) is formed longitudinally in the proximal end of the body (31). The mounting leaf (313) is formed on and protrudes from the outside wall of the body (31) and attaches securely to the cover (72) to mount the pivoting leaf (30) on the cover (72).

The pintle (32) extends from the proximal end of the pivoting leaf (30), is mounted tightly but rotatably in the gudgeon (21), expands the bushing (20) to fit the bushing (20) tightly in the barrel (15) and may have a keyed inner end. The keyed inner end of the pintle (32) corresponds to and is mounted securely in the keyed hole (311).

The positive stop (33) extends from the proximal end of the pivoting leaf (30), corresponds to and selectively abuts the limiting protrusion (14) to limit the movement of the pivoting leaf (30) relative to the stationary leaf (10) and may be mounted securely in the stop hole (312).

Therefore, the tabs (23) formed by cutting and bending the bushing (20) itself allows the hinge assembly to have a downscale bushing (20) and uses less material thereby reducing the size and weight of the hinge assembly. Consequently, the hinge assembly is cheaper and allows electronic devices to be smaller and lighter.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge assembly comprising a stationary leaf having
   a distal end;
   a barrel having
      a mounting hole being formed coaxially through the barrel;
      an inner surface;
      two end edges;
      two slots being opposite to each other and formed longitudinally in the inside surface and through the end edges of the barrel and communicating with the mounting hole; and
      a channel being formed longitudinally through the inner surface and the end edges of the barrel and communicating with the mounting hole; and
   a bushing being mounted securely in the mounting hole and having two end edges;
      a gudgeon being formed coaxially through the bushing;
      a slit being formed longitudinally through the bushing; and
      two securing members being formed symmetrically on the bushing by cutting and bending, protruding toward opposite directions and respectively engaging the slots of the stationary leaf; and
   a pivoting leaf being mounted rotatably and tightly in the gudgeon of the bushing, abutting one of the end edges of the barrel and having
      a proximal end;
      a body having
         a proximal end;
         an outside wall; and
         a mounting leaf being formed on and protruding from the out side wall of the body; and
      a pintle extending from the proximal end of the pivoting leaf and being mounted tightly but rotatably in the gudgeon.

2. The hinge assembly as claimed in claim 1, wherein the stationary leaf further has a limiting protrusion being formed on one of the end edges of the barrel; and
   the pivoting leaf further has a positive stop extending from the proximal end of the pivoting leaf and corresponding to and selectively abutting the limiting protrusion.

3. The hinge assembly as claimed in claim 2, wherein the pivoting leaf further has a keyed hole being formed longitudinally in the proximal end of the body and being non-circular in cross-section; and
   the pintle of the pivoting leaf further has a keyed inner end corresponding to and being mounted securely in the keyed hole of the pivoting leaf.

4. The hinge assembly as claimed in claim 3, wherein the pivoting leaf further has a stop hole being formed longitudinally in the proximal end of the body; and
   the positive stop is mounted securely in the stop hole.

5. The hinge assembly as claimed in claim 1, wherein the slots of the stationary leaf are formed diametrically opposite to each other to allow the slit of the busing facing either the channel of the stationary leaf or the inner surface of the barrel of the stationary leaf.

6. The hinge assembly as claimed in claim 1, wherein each securing member has a tab, and the two tabs of the securing members are formed respectively on the end edges of the bushing.

7. The hinge assembly as claimed in claim 1, wherein each securing member has two tabs protruding transversely from the bushing and being formed respectively on the end edges of the bushing.

\* \* \* \* \*